Figure 1A:
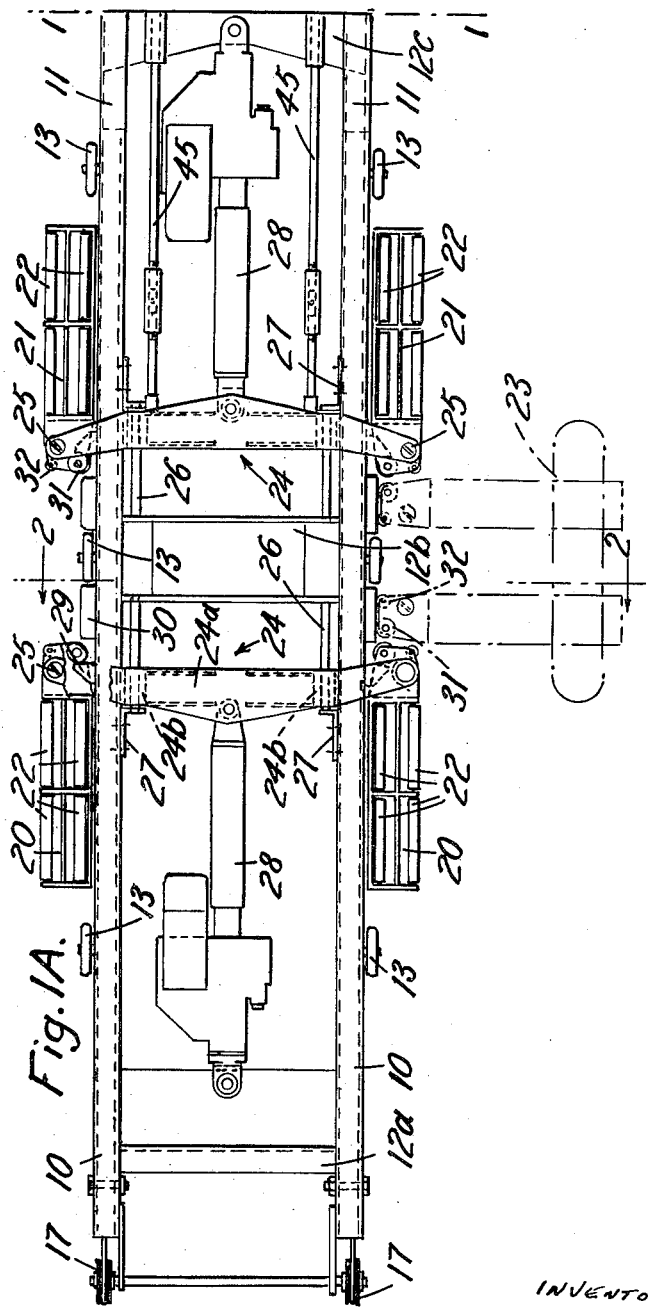

June 12, 1962    F. G. MITCHELL    3,038,621
APPARATUS FOR LIFTING AND TRANSPORTING CARS AND LIKE VEHICLES
Filed April 22, 1960    5 Sheets-Sheet 1

INVENTOR
Frederick Gilbert Mitchell
By Watson, Cole, Grindle & Watson
ATTORNEYS

June 12, 1962  F. G. MITCHELL  3,038,621
APPARATUS FOR LIFTING AND TRANSPORTING CARS AND LIKE VEHICLES
Filed April 22, 1960  5 Sheets-Sheet 2
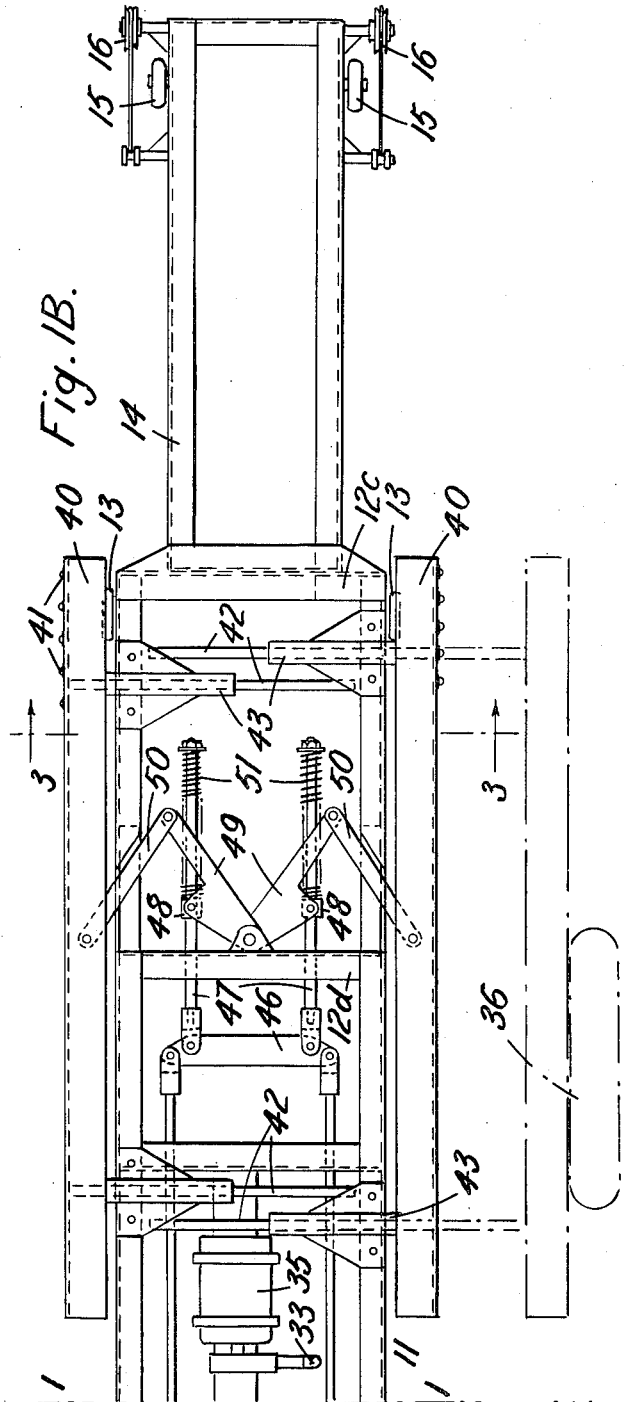
INVENTOR
Frederick Gilbert Mitchell
By Watson, Cole, Grindle & Watson

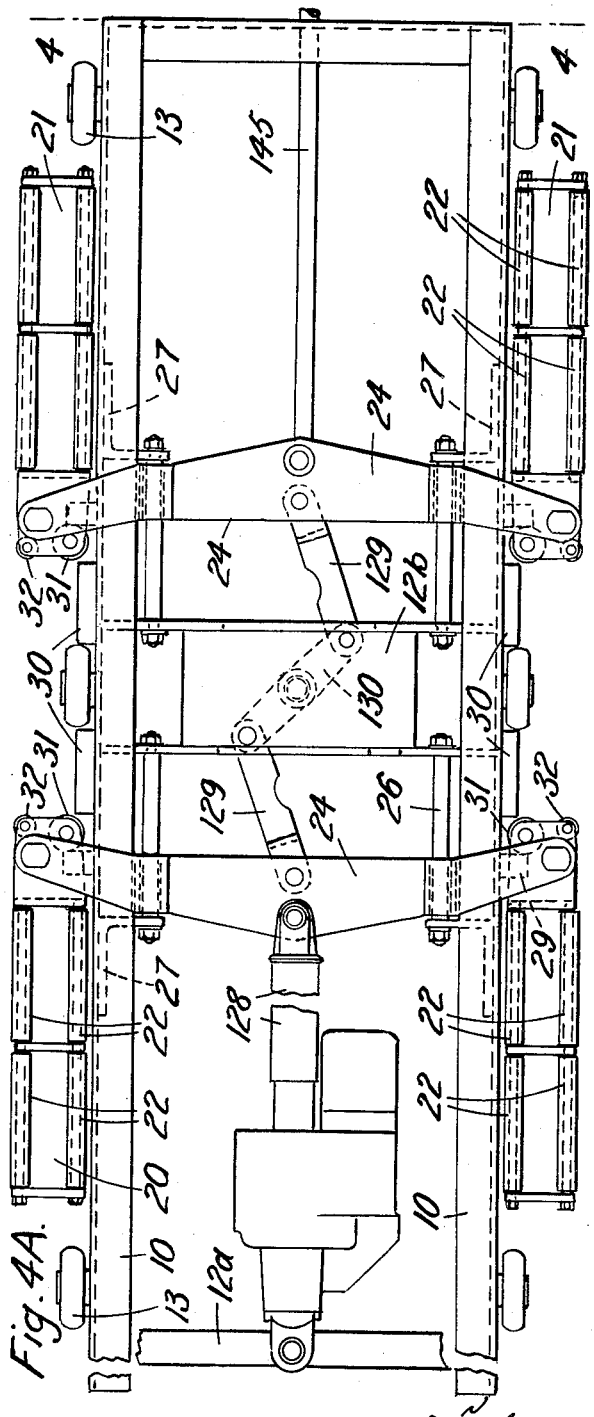

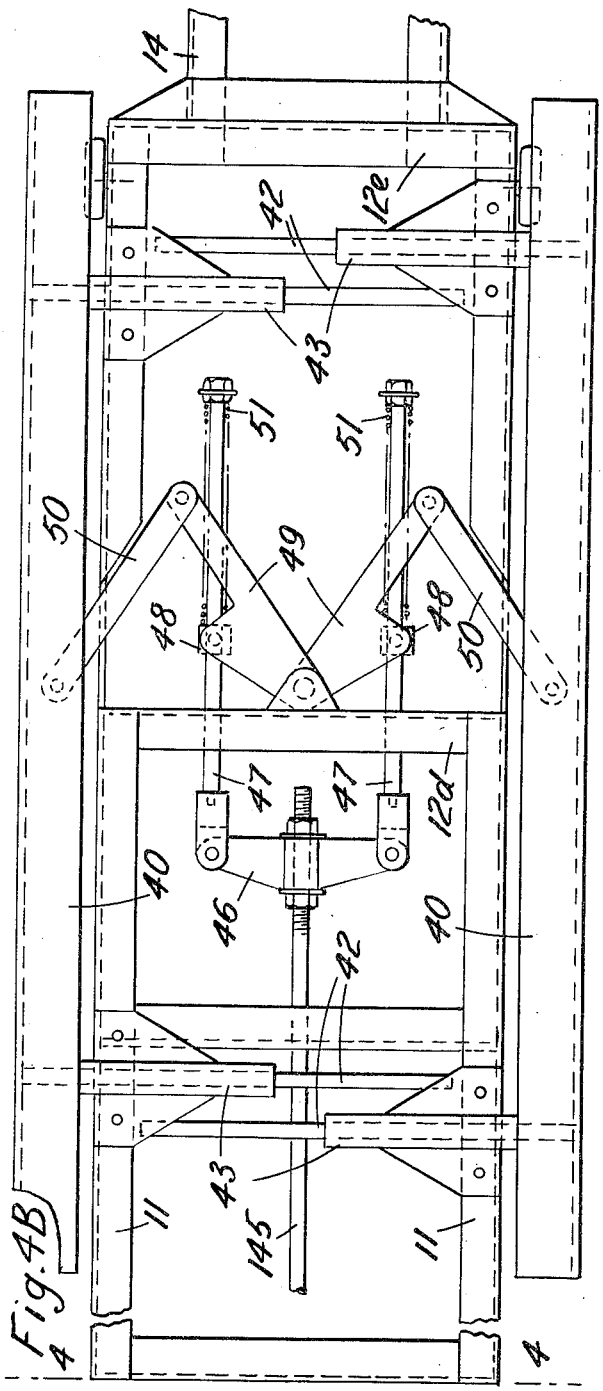

United States Patent Office
3,038,621
Patented June 12, 1962

3,038,621
APPARATUS FOR LIFTING AND TRANSPORTING CARS AND LIKE VEHICLES
Frederick Gilbert Mitchell, 1 Bedford Square, London W.C.1, England
Filed Apr. 22, 1960, Ser. No. 24,082
Claims priority, application Great Britain Apr. 23, 1959
7 Claims. (Cl. 214—333)

This invention relates to apparatus for lifting and transporting cars and like vehicles (hereinafter referred to generically as "cars"). Such apparatus finds particular application in multi-storey car parks for instance for moving cars on and off lift platforms, and for moving cars between the lifts and the parking stations.

According to the invention, apparatus for handling cars comprises a travelling frame, sets of rollers mounted on the frame for movement between operative positions in which they extend close to the ground fore and aft of wheels of a car transverse to its track, and inoperative positions clear of said track, the rollers being arranged when being moved to their operative positions to engage the treads of a pair of car wheels to lift the wheels, and power means for effecting movement of the rollers.

The apparatus is preferably mounted as close to the ground as is feasible, both to avoid risk of fouling the underside of a car, in case the apparatus is arranged for movement inside the track of the wheel, and also so that the mechanical disadvantage of the lifting action may be minimised.

In one arrangement according to the invention, the frame is constructed to travel beneath a car and between its wheels and the rollers for engaging the car wheels are pivotally mounted to swing relative to the frame substantially horizontally between a non-operative position in which they lie parallel to and against longitudinal members of the frame, and an operative position in which they extend laterally outwards from the frame, there being two sets of rollers at each side of the frame, the rollers of one set swinging to engage behind a pair of car wheels and the rollers of the other set swinging to engage in front of these wheels. The sets of rollers in this case are preferably carried by associated swinging arms mounted to swing relative to the travelling frame and the power means is connected to effect swinging of the arms to move the rollers between their operative and inoperative positions.

The apparatus may if desired comprise further wheel engaging rollers as set forth movable between inoperative positions and operative positions in which they engage and lift another pair of wheels of the car. In order to lift a car by two pairs of its wheels using such apparatus, the frame may carry the rollers either at a fixed spacing corresponding to a standard car wheelbase or with the rollers for lifting one pair of wheels movable on the frame relative to the rollers for lifting another pair of wheels to accommodate cars of various wheelbases. Alternatively, the rollers may be carried on relatively movable frames which may be arranged one above the other.

The frame itself may be arranged for travel with respect to a frame fixed, for example, on a lift platform. Such travelling frames may be guided between rollers or the like rotatable about vertical axes or by means of similar rollers positioned in guide slots. Wheels, rollers or other supporting members are preferably provided to support the travelling frame when extended, and also the outer ends of the lifting rollers.

Instead of lifting both pairs of car wheels, the steerable wheels may be guided by means carried by the frame for engaging and preventing turning of steerable wheels of the car during handling. In one form, such means comprises bars movable laterally relative to the frame between a retracted position against the frame and a wheel-engaging position in which the bars constrain the steered wheels to maintain a straight-travel setting, and operating means to effect movement of the bars between these positions. The operating means for the bars may include a resilient connection to accommodate different wheel spacings.

Figure 2:
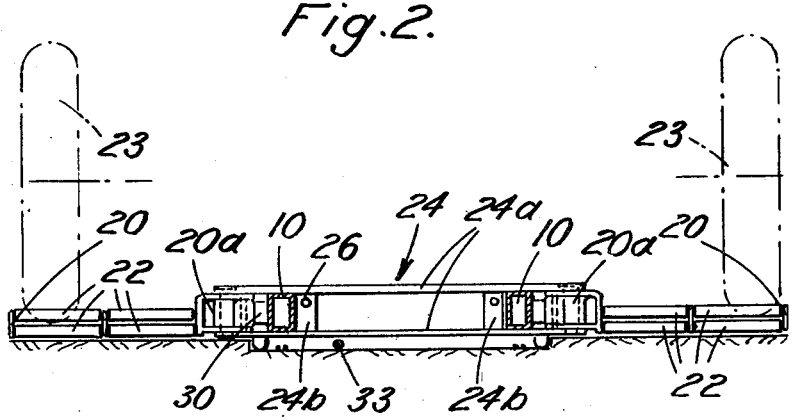
Figure 3:
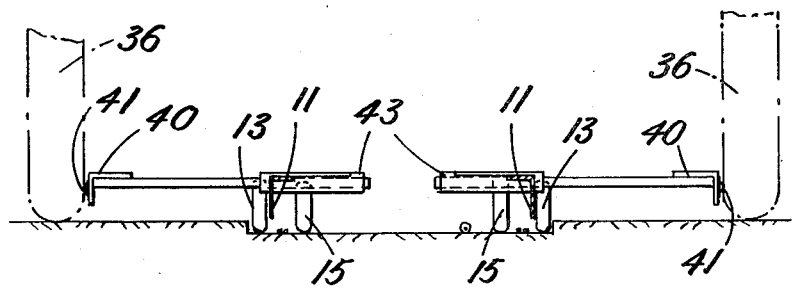

Two embodiments of vehicle handling device of this invention will now be described with reference to the accompanying drawings, in which:

FIGURES 1A and 1B together form a plan view of one embodiment, the line of junction of the FIGURES being indicated at 1—1;

FIGURES 2 and 3 are sections on the lines 2—2 and 3—3 of FIGURES 1A and 1B respectively, and FIGURES 4A and 4B together constitute a plan view of a second embodiment, the line of junction being indicated at 4—4.

In the construction of FIGURES 1A, 1B, 2 and 3, there is shown a trolley for handling wheeled vehicles, the trolley having means to lift the back wheels of the vehicle and means for preventing turning of the vehicle steered wheels whilst the vehicle is being moved. The apparatus is suitable for use with multi-storey car parks for moving cars onto and off from lifts.

The trolley comprises a travelling frame or chassis including a pair of box-section longitudinal members 10 to which are secured at one end a pair of angle-section longitudinal members 11, and a series of transverse chassis members 12a, 12b, 12c, 12d, 12e, the chassis being mounted on pairs of small diameter tyred wheels 13 which are laterally outside the chassis. The chassis also has an extension frame 14 at one end carrying a further pair of wheels 15 and also a set of pulleys 16. A second set of pulleys 17 is provided at the opposite end of the chassis. Cables 18 by which the trolley is moved run over the pulleys 16, 17.

The means for lifting the rear wheels of the vehicle being handled comprises two pairs of arms 20, 21 disposed outside and on each side of the chassis members 10. The arms are capable of being moved from a retracted position as shown in full lines in FIGURE 1A to an operative position as shown in chain lines in FIGURE 1 and in full lines in FIGURE 2. Each of the arms 20, 21 carries a set of rollers 22 which engage the vehicle rear wheel 23, the sets of rollers on the arms 20 engaging behind the wheels and the sets of rollers on the arms 21 engaging in front of the wheels.

Each pair of arms 20 or 21, is pivoted to the ends of a corresponding cross-head 24 formed by a pair of plates 24a (FIGURE 2) disposed respectively above and below the members 10, and by a pair of spacer and guide blocks 24b secured to and holding the plates in spaced relation. The arms 20, 21 have pivot bosses 20a at their ends which lie between the ends of the crosshead plates and are connected to the plates by pivot pins 25. The blocks 24b are slidably mounted on guide rods 26 extending parallel to the longitudinal members 10 between the transverse member 12b and angle brackets 27.

Electrically operated telescopic actuators 28 extend between the cross-heads 24 and the chassis members 12a and 12c respectively, and by extending and collapsing the actuators 28, the cross-heads are caused to slide along the guide rods 26.

Each chassis member 10 carries for each cross-head 24 a cam block 29 which causes retraction of the arms 20, 21 and a cam block 30 which causes extension of the arms to their operative positions. The cam blocks 30 are such that, when the actuators extend and the cross-heads move towards one another, cam follower rollers 31 carried by the bosses 20a contact the cam blocks 30 causing the arms 20 to swing from their retracted positions to their operative positions, this swinging being limited by limit rollers 32 on the arms coming into abutment with the cam blocks 30. During this movement the rollers 22 come into contact with the rear wheels 23 of the vehicle and during the latter part of the movement, the arms exert a pinching action on the rear wheels forcing them upwardly until they rest on the rollers 22. When the actuators 28 contract, the rollers 31 come up against the retraction cam blocks 29 and the arms 20 are caused to swing to their retracted positions so lowering the rear wheels into contact with ground. In order to secure the greater mechanical advantage, the frame and swinging arms are kept as close to the ground as possible so that the rollers 22 make contact with the wheel treads close to the ground.

The actuators 28 are shown as being supplied with power by a cable 33 located in the bottom of a channel track 34 in which the trolley runs, the cable 33 leading to a junction box 35 mounted on the chassis.

The means to prevent the front wheels 36 of the car from turning during handling comprises a pair of angle section bars 40 disposed one outside each of the chassis members 11 to be movable from the full line (inoperative) position of FIGURE 1B to the chain line (and operative) position in which the bars 40 contact the wheels 36 through balls 41 housed in sockets along the outer faces of the bars.

The bars 40 are secured to slide rods 42 which are mounted to slide in tubes 43 secured to the chassis, and the rods 42 and tubes 43 support the bars 40 for displacement at right angles to the longitudinal chassis members. Displacement of the bars 40 is effected by one of the actuators 28 in unison with movement of the associated cross-head 24. For this purpose, the cross-head 24 is connected by adjustable links 45 to a further cross-head 46 to which are pivoted a pair of rods 47.

The rods 47 have slidably mounted on their pivot blocks 48 which are carried by a pair of levers 49, the levers at one end being pivoted to the chassis member 12d and at the other end being connected by links 50 to the bars 40. The rods 47 also carry compression springs 51 which bear on the pivot blocks 48.

As the right-hand cross-head 24 moves to the left as viewed in FIGURE 1A so the cross-head 46 and the rods 47 are drawn to the left. A load is thus transmitted to the pivot blocks 48 by the springs 51 so causing the levers 49 to swing away from each other to move the bars 40 outwardly from the chassis. As soon as the bars 40 come into contact with the wheels 36, further movement of the bars 40 and levers 49 is resisted and any additional movement of the rods 47 is accommodated by compression of the springs 51. This lost-motion effect allows the apparatus to be used with cars having different wheel spacings without adjustment of the bar operating mechanism. If the steering wheels 36 are not straight when the bars 40 contact them, they will be turned automatically by the bars contacting them at the front or rear only, and the wheels will be turned until they are set for straight travel.

In FIGURES 4A, 4B, there is shown a similar arrangement and the same references are employed in these figures as are employed in FIGURES 1A to 3 to indicate corresponding parts.

In this construction, there is but a single actuator 128 for operating the arms 20, 21 and the bars 40. In this case the actuator 128 is connected to one cross-head 24 and the cross-heads 24 are connected by links 129 to opposite ends of a lever 130 pivoted by its centre in the chassis member 12b. In this way the cross-heads are constrained to move together by equal extents but in opposite directions. A link 145 joins the right hand cross-head 24 to the cross-head 46 to which the rods 47 are attached.

I claim:

1. Apparatus for handling a wheeled vehicle, said apparatus comprising a travelling frame, first and second cross-heads extending transversely across said frame and mounted on the frame for movement lengthwise of the frame, two pairs of arms, one pair of arms being associated with the first cross-head and the other pair of arms being associated with the second cross-head, each pair of arms being pivoted to the associated cross-head, one at each end thereof to swing between an inoperative position and an operative position in which the arms extend laterally of the frame, a plurality of pairs of longitudinally-spaced cam blocks mounted on said frame, one pair of said cam blocks being associated with each of said arms, a follower roller mounted on each arm and co-operating with the associated pair of cam blocks, power means connected to said cross-heads to move them simultaneously towards one another and simultaneously away from one another, thereby moving the follower rollers relative to their associated pair of cam blocks, movement of the cross-heads in one sense moving each follower roller into engagement with one cam block of its associated pair of cam blocks and effecting swinging of the associated arm into its inoperative position and movement of the cross-heads in the opposite sense moving each follower roller into engagement with the other cam block of its associated pair of cam blocks, and effecting swinging of the associated arm into its operative position, each of said arms carrying wheel-engaging rollers extending lengthwise of the arms, the arms on adjacent ends of the cross-heads coming into contact with the vehicle wheels at a point in the movement of the arms intermediate the inoperative and operative positions thereof and during the end portion of their movement towards their operative positions exerting a pinching action on the wheels to lift them.

2. Apparatus according to claim 1 wherein said wheel-engaging rollers on each arm are arranged in two parallel sets spaced apart transversely of the arm, the leading set of said wheel-engaging rollers during movement of the arm towards its operative position being positioned at a level lower than the other set.

3. Apparatus according to claim 1, wherein the power means comprises a telescopic actuator for each cross-head.

4. Apparatus according to claim 1, wherein the power means comprises a single telescopic actuator connected to move the first cross-head and the second cross-head is coupled to the one cross-head to be moved simultaneously therewith and in the opposite direction.

5. Apparatus according to claim 1 comprising means carried by the frame for engaging and preventing turning of steerable wheels of the car during handling, said means comprising bars movable laterally relative to the frame between a retracted position against the frame and a wheel-engaging position in which the bars constrain the steered wheels to maintain a straight-travel setting, and operating means to effect movement of the bars between these positions, the operating means for the bars including a resilient connection to accommodate different wheel spacings.

6. Apparatus according to claim 5, wherein the bars carry balls along their wheel-engaging faces.

7. Apparatus according to claim 5, wherein operating means comprises a cross-head movable longitudinally of the frame, a pair of rods pivoted to the cross-head, each rod carrying an associated pivot block which is slidable on the rod, springs carried on the rods and loading the pivot blocks, and a pair of levers, one associated with each rod, each rod being pivoted by one end to the frame and linked at its other end to an associated one of the bars, the pivot blocks being pivoted one to each of the levers, the bars being mounted on the frame by transversely-extending slides.

References Cited in the file of this patent

UNITED STATES PATENTS

| | | |
|---|---|---|
| 1,962,127 | Balkema et al. | June 12, 1934 |

FOREIGN PATENTS

| | | |
|---|---|---|
| 550,725 | Italy | Nov. 7, 1956 |
| 1,127,134 | France | Aug. 6, 1956 |